United States Patent Office 3,194,806
Patented July 13, 1965

3,194,806
NOVEL PHARMACOLOGICALLY ACTIVE
QUINAZOLINONE COMPOUND
Karl-Heinz Boltze, Bensberg, Dietrich Lorenz, Klein
Hurden, Post Immekeppel, Bensberg, and Maria Rü-
berg-Schweer, Bochum, Germany, assignors to Tropon-
werke Dinklage & Co., Cologne-Mulheim, Germany
No Drawing. Filed Mar. 14, 1963, Ser. No. 265,073
Claims priority, application Germany, Mar. 16, 1962,
T 21,763
4 Claims. (Cl. 260—240)

This invention relates to novel pharmacologically active substituted quinazolinone compounds and a method of preparing said compounds, more particularly to novel pharmacologically active compounds of the general Formula I and salts thereof with physiologically compatible acids:

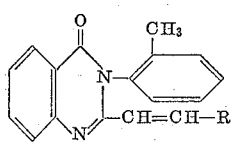

(I)

R in the formula being the pyridyl-(2), pyridyl-(3) or pyridyl-(4) group.

The present compounds of the general Formula I are characterized by a pronounced centrally sedative and anti-convulsive action. 2-{β-[pyridyl-(2)]-ethenyl}-3-[2-methylphenyl]-quinazolinone-(4) (hereinafter referred to as PMC) is cited by way of example. This compound shows a very strong centrally sedative effect and very low toxicity as compared with several commercially available sedatives and anti-epileptics. The hypnotic effect which, as is known, restricts the use of anti-convulsive agents in the treatment of epilepsy is substantially lower in case of the compound of the invention than in case of phenobarbital, N-methyl-alpha-phenyl-alpha methyl-succinimide and phenyl acetyl urea. Due to the weak hypnotic effect, the substance is suitable as a psychopharmacon. The electroencephalogram of non-sleeping cats shows an indication of a sound sleep after oral administration of 50 or 100 msg./kg. without any sign of hypnosis being shown externally by the animals. Acoustic impulses cause the EEG sleeping pattern to disappear suddenly (arousal reaction). The acute toxicity of PMC is so low that lethality cannot be achieved with rats and mice with a single administration ($LD_{50}$ in excess of 6,000 mgs./kg.). Thus, the therapeutic spectrum exceeds many times that of all compounds mentioned for comparison. As regards chronic toxicity, all rats survived without toxic phenomena when fed chronically for several weeks with daily doses of 500 mgs./kg. of PMC.

Of the compounds mentioned in literature, the two compounds 2-styryl-3-phenyl- and 2-styryl-3-o-tolylquinazolinone-(4) are next to the compounds of the invention of the general Formula I. Their pharmacodynamic activity is by many times lower than that of the compounds of the invention.

The present compounds of the general Formula I are prepared in a manner known per se. An example of a suitable method is the reaction of the appropriate compound of the Formula II

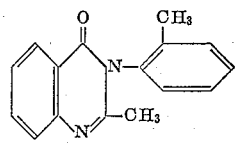

(II)

by condensation with aldehydes of the general Formula III

(III)

wherein R has the meaning set forth above. The condensation may be effected in a manner which is usual for condensation reactions of this kind. For example, it may be effected by simply fusing together the compounds to be reacted. It is preferred to operate in the presence of a solvent and of a catalyst, suitable being both aqueous solutions and solutions in organic solvents. Preferred organic solvents are those which contain polar groups which are inert in the reaction. Thus, for example, alcoholic solvents or carboxylic acids such as glacial acetic acid may be used besides aqueous solutions. Suitable catalysts are conventional acidic or alkaline additions such as, for example, potassium hydroxide or sodium hydroxide solutions, organic bases such as pyridine, pyrrolidine, triethylamine or acetates thereof, salts such as ammonium acetate, sodium acetate and the like. Examples of acidic catalysts include strong mineral acids such as sulfuric or hydrochloric acids. An example of a particularly suitable catalyst is acetamide. In this case, the condensation is effected at elevated temperatures, it being preferred to use temperatures within the boiling range of the particular solvent used.

If the quinazolinone compounds of the invention are used as salts, the acids conventionally used in pharmacy for the formation of salts may be used. Examples hereof are the known edible acids such as acetic acid, lactic acid, tartaric acid, citric acid, or pharmacologically usable mineral acids such as hydrochloric acid or sulfuric acid.

EXAMPLE 1

2-{β-[pyridyl-(2)-]-ethenyl}-3-[2-methylphenyl]-
quinazolinone-(4)

A solution of 20 g. (0.08 mol) of 2-methyl-3-[2-methylphenyl]-quinazolinone-(4) in 100 ml. of absolute methanol is mixed with a solution of 4.5 g. (0.08 mol) of KOH in 40 ml. of absolute methanol and then with 9.65 g. (0.08 mol) of alpha pyridine aldehyde. The resultant mixture is refluxed for 1½ hours, kept for 12 hours at room temperature, and the resultant precipitate is filtered, boiled first with water and then with methanol and finally digested with ether. M.P., 195–196° C.; yield, 17.4 g.=62% of theory.

EXAMPLE 2

2-{β-[pyridyl-(3)]-ethenyl}-3-[2-methylphenyl]-
quinazolinone-(4)

This compound is prepared by the procedure described in Example 1 from 20 g. (0.08 mol) of 2-methyl-3-[2-

TABLE A

| Compound | Electroshock $DE_{50}$, mg./kg. | Cardiazol shock $DE_{50}$, mg./kg. | Motility $DE_{50}$, mg./kg. | Sedation | | $LD_{50}$, mg./kg. |
|---|---|---|---|---|---|---|
| | | | | Balance test $DE_{50}$, mg./kg. | Hypnosis $DE_{50}$, mg./kg. | |
| 2-{β-[pyridyl-(2)]-ethenyl}-3-[2-methylphenyl]-quinazolinone-(4) | 14.5 | 145 | 58 | 120 | 1,600 | >6,000 |
| Phenobarbital | 16 | 35 | 65 | 32 | 102 | 140 |
| Meprobamate | 30 | 90 | 330 | 105 | 350 | 940 |
| Chlordiazepoxide | 57 | 16 | 76 | 23 | 280 | 550 |
| Diphenylhydantoin | 15 | 166 | 75 | 169 | >2,000 | 250 |
| Alpha phenyl acetyl urea | 39 | 140 | 750 | 139 | 740 | 940 | methylphenyl]-quinazolinone-(4), 4.5 g. of KOH and 9.65 g. (0.08 mol) of pyridine aldehyde-(3). M.P., 200–201° C. Yield, 16.5 g.=60% of theory.

EXAMPLE 3

2-{β-[pyridyl-(4)]-ethenyl}-3-[2-methylphenyl]-quinazolinone-(4)

0.025 mol=6 g. of 2-methyl-3-[2-methylphenyl]-quinazolinone-(4) and 0.025 mol (=2.7 g.) of pyridine aldehyde-(4) are dissolved in 50 ml. of glacial acetic acid, mixed with 0.025 mol (2.15 gms.) of piperidine, refluxed for 2 hours and freed from glacial acetic acid by distillation. The resultant reddish viscous residue solidifies on boiling in water. After filtration, the precipitate is dissolved in ethyl alcohol, precipitated again by addition of water, subjected to suction filtration, washed with ether and recrystallized from little alcohol. M.P., 170–171° C. Yield, 3.45 gms. (35% of theory).

What is claimed is:

1. A member selected from the group consisting of compounds of the formula

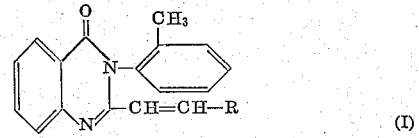

and their non-toxic, pharmaceutically acceptable, acid addition salts, wherein R is a member of the group consisting of pyridyl-(2), pyridyl-(3) and pyridyl-(4).

2. 2-{β-[pyridyl-(2)-]-ethenyl}-3-[2-methylphenyl]-quinazolinone-(4).

3. 2-{β-[pyridyl-(3)-]-ethenyl}-3-[2-methylphenyl]-quinazolinone-(4).

4. 2-{β-[pyridyl-(4)-]-ethenyl}-3-[2-methylphenyl]-quinazolinone-(4).

References Cited by the Examiner

UNITED STATES PATENTS 2,861,929  11/58  Berlin et al. _____ 260—240.4
2,955,073  10/60  De Beer _____ 167—65
2,965,485  12/60  Duffin et al. _____ 260—240 XR

OTHER REFERENCES

Bianchi et al.: J. Pharm. Pharmacol, vol. 12, pages 501 to 505 (1960).

Bogert et al.: J. Am. Chem. Soc., vol. 34, pages 516–534 (1912).

Elderfield: Heterocyclic Compounds, vol. 6 (New York, 1957), page 350.

Elderfield: Heterocyclic Compounds, vol. 1 (New York, 1950), page 589.

Gujral et al.: Ind. Jour. Med. Res., vol. 45, No. 2, pages 204 to 211 (1957).

Iver et al.: Chem. Abstracts, vol. 53, page 21980d (1959).

WALTER A. MODANCE, Primary Examiner.

NICHOLAS S. RIZZO, Examiner.